(12) United States Patent
Kanemitsu et al.

(10) Patent No.: US 8,648,937 B2
(45) Date of Patent: Feb. 11, 2014

(54) IMAGE PROCESSING APPARATUS, IMAGE PROCESSING METHOD, AND CAMERA MODULE

(75) Inventors: Shiroshi Kanemitsu, Kanagawa (JP); Kazuhiro Tabuchi, Kanagawa (JP); Takaaki Kawakami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 13/297,598

(22) Filed: Nov. 16, 2011

(65) Prior Publication Data

US 2012/0212653 A1  Aug. 23, 2012

(30) Foreign Application Priority Data

Feb. 18, 2011 (JP) .................. 2011-033129

(51) Int. Cl.
*H04N 5/217* (2011.01)
*H04N 5/225* (2006.01)
*G06K 9/00* (2006.01)

(52) U.S. Cl.
USPC ............................ 348/241; 348/342; 382/162

(58) Field of Classification Search
USPC ........ 348/222.1, 235, 241–242, 273; 382/167
See application file for complete search history.

(56) References Cited

U.S. PATENT DOCUMENTS

| | | | | |
|---|---|---|---|---|
| 2004/0091145 A1* | 5/2004 | Kohashi et al. | ............... | 382/162 |
| 2008/0204577 A1* | 8/2008 | Tsuruoka | .................... | 348/241 |
| 2010/0097503 A1* | 4/2010 | Aragaki | ........................ | 348/241 |
| 2010/0231759 A1* | 9/2010 | Tsutsumi et al. | ............ | 348/242 |
| 2011/0037877 A1* | 2/2011 | Tamaru | ........................ | 348/239 |

FOREIGN PATENT DOCUMENTS

| | | |
|---|---|---|
| JP | 5-48471 | 6/1993 |
| JP | 10-200787 | 7/1998 |
| JP | 2008-283442 | 11/2008 |

* cited by examiner

*Primary Examiner* — Trung Diep
(74) *Attorney, Agent, or Firm* — Oblon, Spivak, McClelland, Maier & Neustadt, L.L.P.

(57) ABSTRACT

According to one embodiment, an image processing apparatus includes a color-difference signal correction unit. The color-difference signal correction unit includes a smoothing unit and a color edge extracting unit. The smoothing unit performs smoothing process on a color-difference signal to obtain a smoothed color-difference signal. The color edge extracting unit extracts a color edge component to be added to the smoothed color-difference signal. An edge coring unit which is included in the color edge extracting unit performs a coring process on a difference between the color-difference signal before the smoothing process is performed and the smoothed color-difference signal.

20 Claims, 6 Drawing Sheets

IMAGE PROCESSING APPARATUS, IMAGE PROCESSING METHOD, AND CAMERA MODULE

CROSS-REFERENCE TO RELATED APPLICATIONS

This application is based upon and claims the benefit of priority from Japanese Patent Application No. 2011-033129, filed on Feb. 18, 2011; the entire contents of all of which are incorporated herein by reference.

FIELD

Embodiments described herein relate generally to an image processing apparatus, an image processing method, and a camera module.

BACKGROUND

In the generation of digital images by, for example, a digital camera, the problem is noise (hereinafter, appropriately referred to as "color noise") occurring in a color component. In order to reduce the color noise, for example, a low-pass filter (LPF) process is performed on a color-difference signal.

In many cases, the color noise is generated in a low frequency range in which a variation in a signal level is small. Therefore, it is preferable to reduce the passband of the LPF in order to effectively cancel the color noise. However, when the passband of the LPF is reduced, a high frequency component in the object is removed. In this case, blurring (color bleeding) is likely to occur at the boundary between colors.

DETAILED DESCRIPTION

In general, according to one embodiment, an image processing apparatus includes a signal conversion unit and a color-difference signal correction unit. The signal conversion unit converts a signal of each color component into a color-difference signal and a brightness signal. The color-difference signal correction unit corrects the color noise of the color-difference signal from the signal conversion unit. The color-difference signal correction unit includes a smoothing unit and a color edge extracting unit. The smoothing unit performs a smoothing process on the color-difference signal to obtain a smoothed color-difference signal. The color edge extracting unit extracts a color edge component. The color edge component is to be added to the smoothed color-difference signal. The color edge extracting unit includes an edge coring unit. The edge coring unit performs a coring process on a difference between the color-difference signal before the smoothing process is performed and the smoothed color-difference signal.

Exemplary embodiments of an image processing apparatus, an image processing method, and a camera module will be explained below in detail with reference to the accompanying drawings. The present invention is not limited to the following embodiments.

Figure 1:
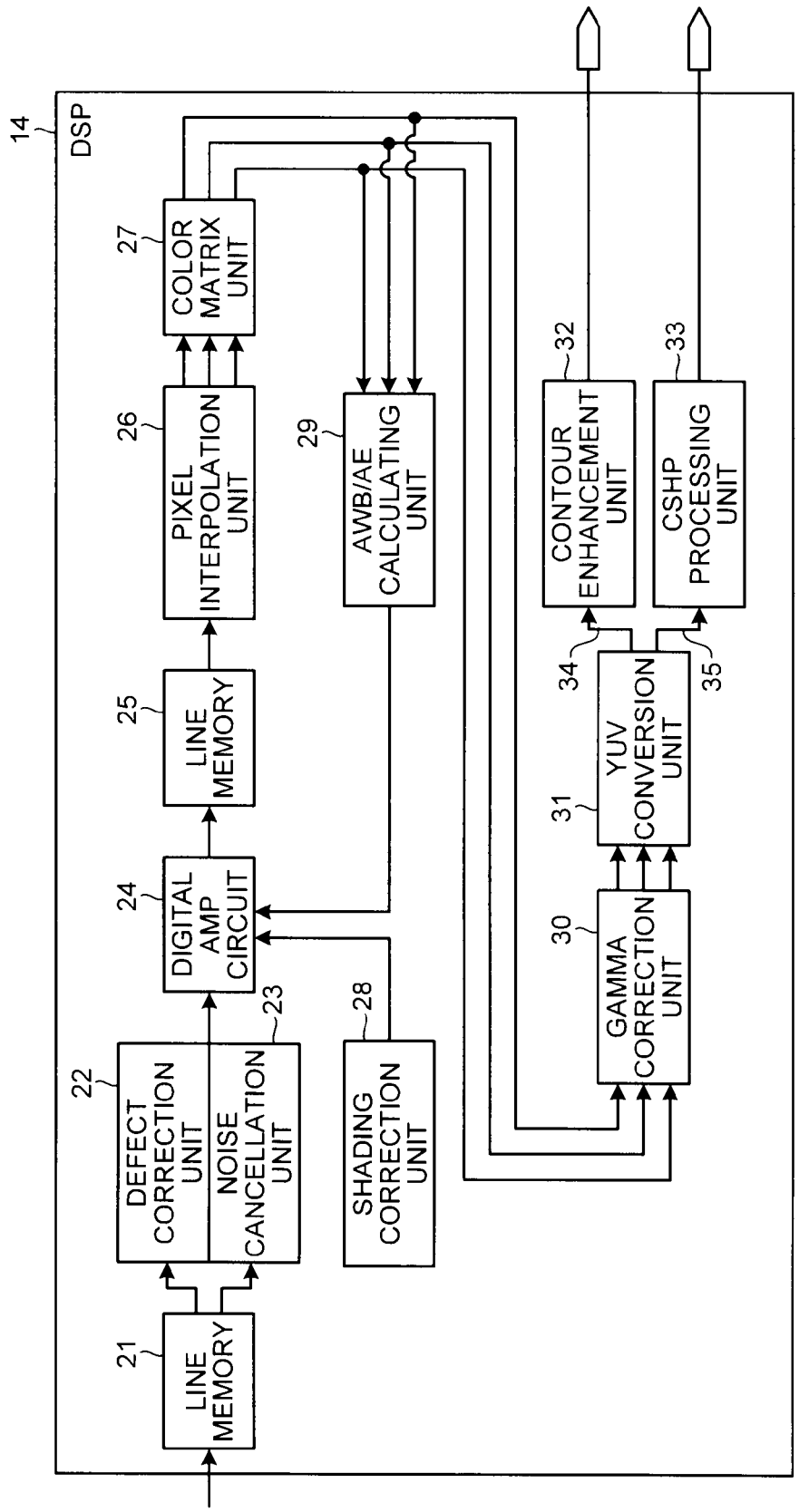
FIG. 1 is a block diagram illustrating the schematic structure of an image processing apparatus according to a first embodiment.
Figure 2:
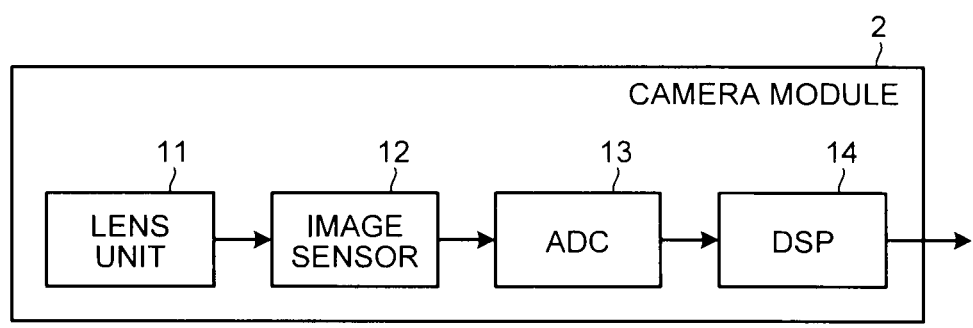
FIG. 2 is a block diagram illustrating the schematic structure of a camera module including the image processing apparatus shown in FIG. 1.
Figure 3:
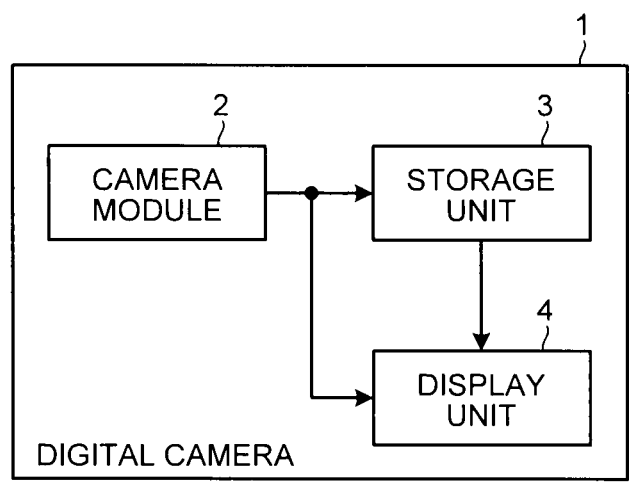
FIG. 3 is a block diagram illustrating the structure of a digital camera, which is an electronic apparatus including the camera module shown in FIG. 2.

FIG. 1 is a block diagram illustrating the schematic structure of an image processing apparatus according to a first embodiment. FIG. 2 is a block diagram illustrating the schematic structure of a camera module including the image processing apparatus shown in FIG. 1. FIG. 3 is a block diagram illustrating the structure of a digital camera, which is an electronic apparatus including the camera module shown in FIG. 2.

A digital camera 1 includes a camera module 2, a storage unit 3, and a display unit 4. The camera module 2 captures an object image. The storage unit 3 stores the image captured by the camera module 2. The display unit 4 displays the image captured by the camera module 2. The display unit 4 is, for example, a liquid crystal display.

The camera module 2 captures the object image and outputs an image signal to the storage unit 3 and the display unit 4. The storage unit 3 outputs the image signal to the display unit 4 according to, for example, the operation of the user. The display unit 4 displays an image corresponding to the image signal input from the camera module 2 or the storage unit 3. The camera module 2 may be applied to electronic apparatuses other than the digital camera 1. For example, the camera module 2 may be applied to a mobile phone with a camera.

The camera module 2 includes a lens unit 11, an image sensor 12, an analog-to-digital converter (ADC) 13, and a digital signal processor (DSP) 14.

The lens unit 11 receives light from an object and forms an object image on the image sensor 12. The image sensor 12 converts the light received by the lens unit 11 into signal charge and captures the object image. The image sensor 12 acquires red (R), green (G), and blue (B) signal values in the order corresponding to a Bayer array and generates an analog image signal.

The ADC 13 converts the analog image signal from the image sensor 12 into a digital image signal. The DSP 14 functions as an image processing apparatus that performs various kinds of image processing on the digital image signal from the ADC 13.

A line memory 21 provided in the DSP 14 temporarily stores the digital image signal from the ADC 13. A defect correction unit 22 and a noise cancellation unit 23 share the line memory 21.

The defect correction unit 22 performs a defect correction process on the digital image signal from the line memory 21. The defect correction unit 22 corrects a defective portion (defect) of the digital image signal due to the pixel which is not normally operated in the image sensor 12.

The noise cancellation unit 23 performs a noise cancellation process of reducing noise. A shading correction unit 28 calculates a shading correction coefficient for correcting the shading of the object image.

A digital amplifier (AMP) circuit 24 calculates a digital AMP coefficient on the basis of a coefficient calculated by an AWB/AE calculating unit 29, which will be described below, and the shading correction coefficient calculated by the shading correction unit 28. The digital AMP circuit 24 multiplies the digital image signal processed by the defect correction unit 22 and the noise cancellation unit 23 by the digital AMP coefficient.

A line memory 25 temporarily stores the digital image signal multiplied by the digital AMP coefficient. A pixel interpolation unit 26 performs an interpolation process (demosaic process) on the digital image signals which are transmitted from the line memory 25 in the order corresponding to the Bayer array and generates RGB signals (sensitivity signals).

A color matrix unit 27 performs a color matrix calculating process (color reproducibility process) for obtaining color reproducibility on the RGB sensitivity signals. The AWB/AE calculating unit 29 calculates coefficients for adjusting auto exposure (AE) and auto white balance (AWB) from the RGB sensitivity signals.

A gamma correction unit 30 performs a gamma correction process of correcting the gradation of the image on the RGB sensitivity signals. A YUV conversion unit 31 generates a brightness (Y) signal 34 and a color difference (UV) signal 35 from the RGB sensitivity signals and converts the image signal from an RGB format into a YUV format (for example, YUV 422 and the like). The YUV conversion unit 31 functions as a signal conversion unit that converts the sensitivity signal of each color component into a Y signal 34 and a UV signal 35.

A contour enhancement unit 32 performs a contour enhancement process on the Y signal 34. The contour enhancement unit 32 uses a correction coefficient which is calculated on the basis of, for example, the imaging conditions of the image sensor 12 (see FIG. 2) or the positions of the pixels for the contour enhancement process. A color sharpness (CSHP) processing unit 33 functions as a color-difference signal correction unit that corrects the color noise of the UV signal 35.

The structure of the DSP 14 according to this embodiment is illustrated as an example and may be appropriately changed. For example, the structure of the DSP 14 may be changed such that elements other than the elements according to this embodiment are added to the DSP 14 or some omissible elements of the DSP 14 are removed.

Figure 4:
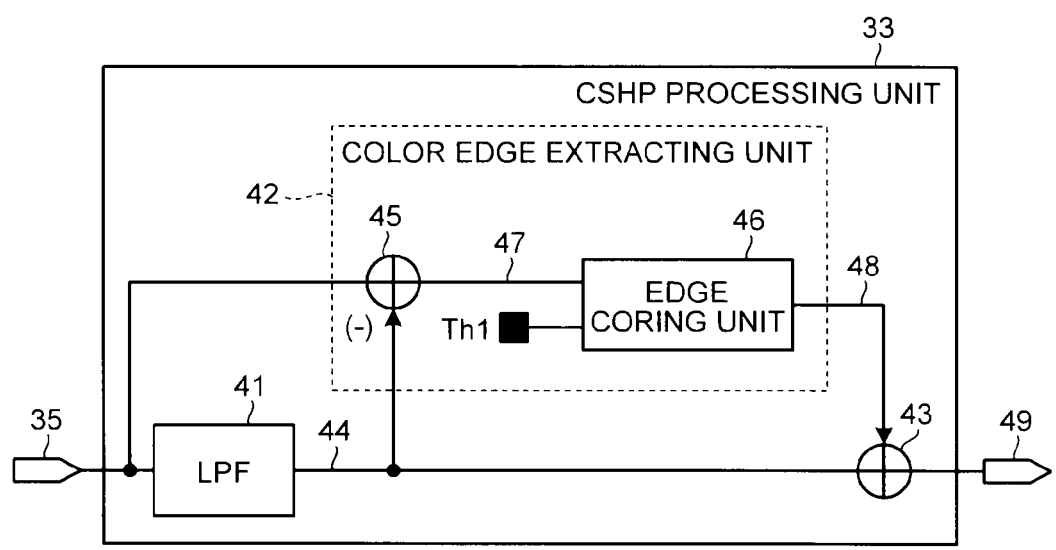
FIG. 4 is a block diagram illustrating the structure of a CSHP processing unit.

FIG. 4 is a block diagram illustrating the structure of the CSHP processing unit. The CSHP processing unit 33 includes an LPF 41, a color edge extracting unit 42, and an adder 43. The LPF 41 functions as a smoothing unit that performs a smoothing process on the UV signal 35 to generate a smoothed color-difference signal 44. The CSHP processing unit 33 reduces color noise by the smoothing process on the UV signal 35 using the LPF 41.

The color edge extracting unit 42 includes a subtractor 45 and an edge coring unit 46. The color edge extracting unit 42 extracts a color edge component. The subtractor 45 generates a difference signal 47 between the UV signal 35 before the smoothing process is performed and the smoothed color-difference signal 44. The edge coring unit 46 performs a coring process (edge coring process) on the difference signal 47 according to the comparison result between the difference signal 47 and a predetermined coring threshold value (Th1).

The edge coring unit 46 regards a component with a level less than the absolute value of the coring threshold value Th1 in the difference signal 47 as the noise component and removes the component. The edge coring unit 46 collectively changes the components with a level less than the coring threshold value Th1 in the difference signal 47 to zero. For example, the color edge extracting unit 42 stores the predetermined coring threshold value Th1.

The color edge extracting unit 42 outputs a color edge component signal 48 subjected to the coring process of the edge coring unit 46. The adder 43 adds the color edge component signal 48 to the smoothed color-difference signal 44. The CSHP processing unit 33 outputs the addition result of the color edge component signal 48 and the smoothed color-difference signal 44 by the adder 43 as a color-noise-corrected UV signal 49.

As such, the CSHP processing unit 33 extracts the color edge component from the signal before the smoothing process is performed and adds the color edge component to the smoothed signal, thereby making a high frequency component remain in the object. The CSHP processing unit 33 makes the high frequency component remain in the color information of the object to reduce color bleeding and performs the coring process to reduce color noise at the boundary between colors. The application of the CSHP processing unit 33 to the DSP 14 makes it possible to effectively reduce color noise and color bleeding. In addition, the structure of the CSHP processing unit 33 according to this embodiment is illustrated as an example and may be appropriately changed.

Figure 5:
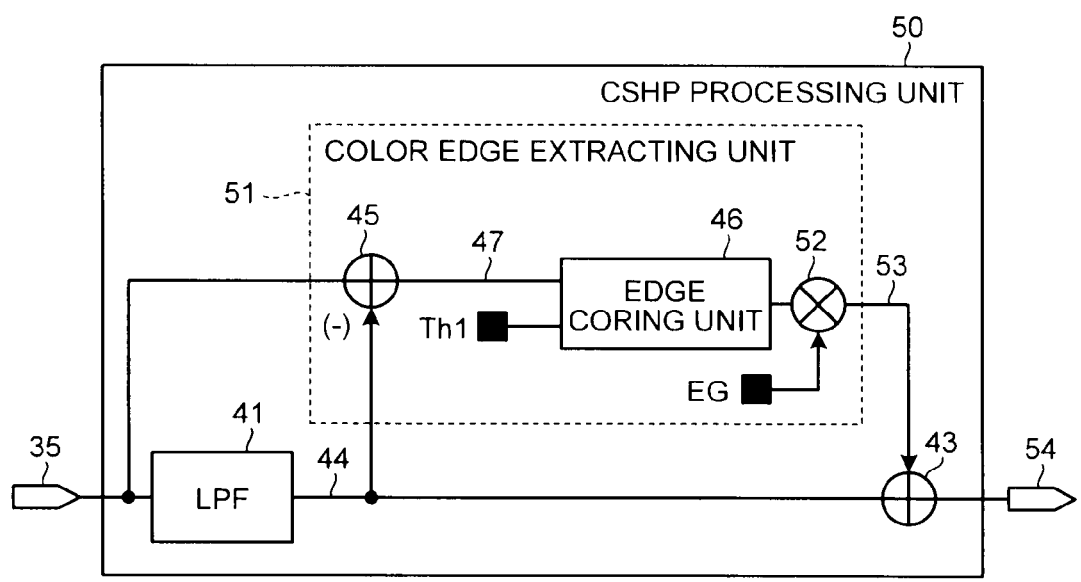
FIG. 5 is a block diagram illustrating the structure of a CSHP processing unit applied to an image processing apparatus according to a second embodiment.

FIG. 5 is a block diagram illustrating the structure of a CSHP processing unit applied to an image processing apparatus according to a second embodiment. The same components as those in the first embodiment are denoted by the same reference numerals and a description thereof will not be repeated. A CSHP processing unit 50 includes an LPF 41, a color edge extracting unit 51, and an adder 43.

The color edge extracting unit 51 includes a subtractor 45, an edge coring unit 46, and a multiplier 52. The multiplier 52 multiplies a difference signal 47 subjected to the coring process of the edge coring unit 46 by an edge gain (EG). The edge gain EG is a coefficient for adjusting a weight of a color edge component with respect to a smoothed color-difference signal 44. For example, the color edge extracting unit 51 stores a predetermined edge gain EG.

The color edge extracting unit 51 outputs a color edge component signal 53 which is multiplied by the edge gain EG by the multiplier 52. The adder 43 adds the color edge component signal 53 to the smoothed color-difference signal 44. The CSHP processing unit 50 outputs the addition result of the color edge component signal 53 and the smoothed color-difference signal 44 by the adder 43 as a color-noise-corrected UV signal 54.

According to the image processing apparatus, the application of the CSHP processing unit 50 makes it possible to effectively reduce color noise and color bleeding, similarly to the first embodiment. In addition, the image processing apparatus can adjust the edge component according to the edge gain EG. Therefore, it is possible to obtain an image excellent in the gradation property. In addition, the structure of the CSHP processing unit 50 according to this embodiment is illustrated as an example and may be appropriately changed.

Figure 6:
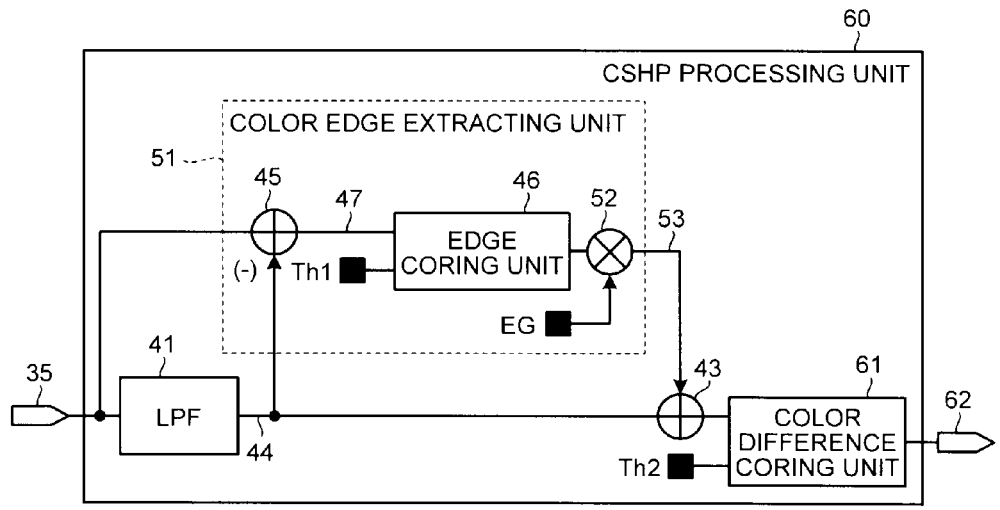
FIG. 6 is a block diagram illustrating the structure of a CSHP processing unit applied to an image processing apparatus according to a third embodiment.

FIG. 6 is a block diagram illustrating the structure of a CSHP processing unit applied to an image processing apparatus according to a third embodiment. The same components as those in the first and second embodiments are denoted by the same reference numerals and a description thereof will not be repeated. A CSHP processing unit 60 includes an LPF 41, a color edge extracting unit 51, an adder 43, and a color difference coring unit 61. The color difference coring unit 61 performs a coring process (color difference coring process) on a smoothed color-difference signal 44 to which a color edge component signal 53 is added.

The color difference coring unit 61 regards a component with a level less than the absolute value of a coring threshold value (Th2) in the addition result of the color edge component signal 53 and the smoothed color-difference signal 44 by the adder 43 as a noise component and removes the component. The color difference coring unit 61 collectively changes the components with a level less than the coring threshold value Th2 in the signal input from the adder 43 to zero. For example, the CSHP processing unit 60 stores a predetermined coring threshold value Th2. The CSHP processing unit 60 outputs the signal input from the color difference coring unit 61 as a color-noise-corrected UV signal 62.

According to the image processing apparatus, similarly to the second embodiment, the application of the CSHP processing unit 60 makes it possible to effectively reduce color noise and color bleeding and obtain an image excellent in the gradation property. The addition of the color edge component emphasizes the sharpness of the boundary between colors and emphasizes color drift in an achromatic region. The image processing apparatus further performs a coring process on the smoothed color-difference signal 44 to which the color edge component signal 53 is added, thereby preventing the achromatic region from being colored.

The structure of the CSHP processing unit 60 according to this embodiment is illustrated as an example and may be appropriately changed. The CSHP processing unit 60 may not perform, for example, the multiplication of the edge gain EG by the multiplier 52.

Figure 7:
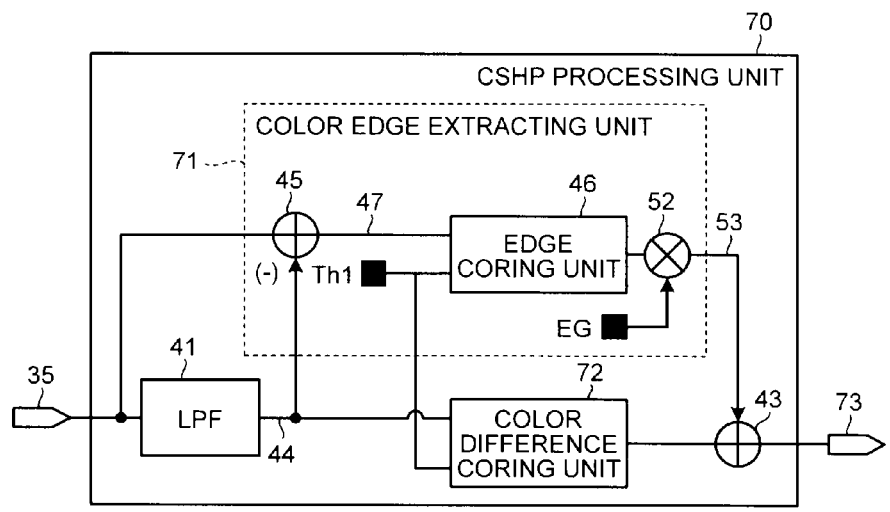
FIG. 7 is a block diagram illustrating the structure of a CSHP processing unit applied to an image processing apparatus according to a fourth embodiment.

FIG. 7 is a block diagram illustrating the structure of a CSHP processing unit applied to an image processing apparatus according to a fourth embodiment. The same components as those in the first and second embodiments are denoted by the same reference numerals and a description thereof will not be repeated. The CSHP processing unit 70 includes an LPF 41, a color edge extracting unit 71, a color difference coring unit 72, and an adder 43. The color difference coring unit 72 performs a coring process on a smoothed color-difference signal 44 before a color edge component signal 53 is added.

The color difference coring unit 72 and an edge coring unit 46 of the color edge extracting unit 71 share a coring threshold value Th1. The color difference coring unit 72 regards a component with a level less than the absolute value of the coring threshold value Th1 in the smoothed color-difference signal 44 as a noise component and removes the component. The color difference coring unit 72 collectively changes the components with a level less than the coring threshold value Th1 in the smoothed color-difference signal 44 to zero. The color difference coring unit 72 may use a coring threshold value which is set separately from the coring threshold value Th1 used by the edge coring unit 46.

The adder 43 adds the color edge component signal 53 to the signal from the color difference coring unit 72. The CSHP processing unit 70 outputs the addition result of the adder 43 as a color-noise-corrected UV signal 73.

According to the image processing apparatus, similarly to the second embodiment, the application of the CSHP processing unit 70 makes it possible to effectively reduce color noise and color bleeding and obtain an image excellent in the gradation property. The image processing apparatus performs a coring process on the smoothed color-difference signal 44 in advance before the color edge component signal 53 is added. In this way, it is possible to prevent coloring in an achromatic region, similarly to the third embodiment.

The structure of the CSHP processing unit 70 according to this embodiment is illustrated as an example and may be appropriately changed. The CSHP processing unit 70 may not perform, for example, the multiplication of the edge gain EG by the multiplier 52. In addition, the CSHP processing unit 70 may use the edge coring unit 46 and the color difference coring unit 72 may share the circuit structure. In this way, it is possible to reduce the size of the circuit.

Figure 8:
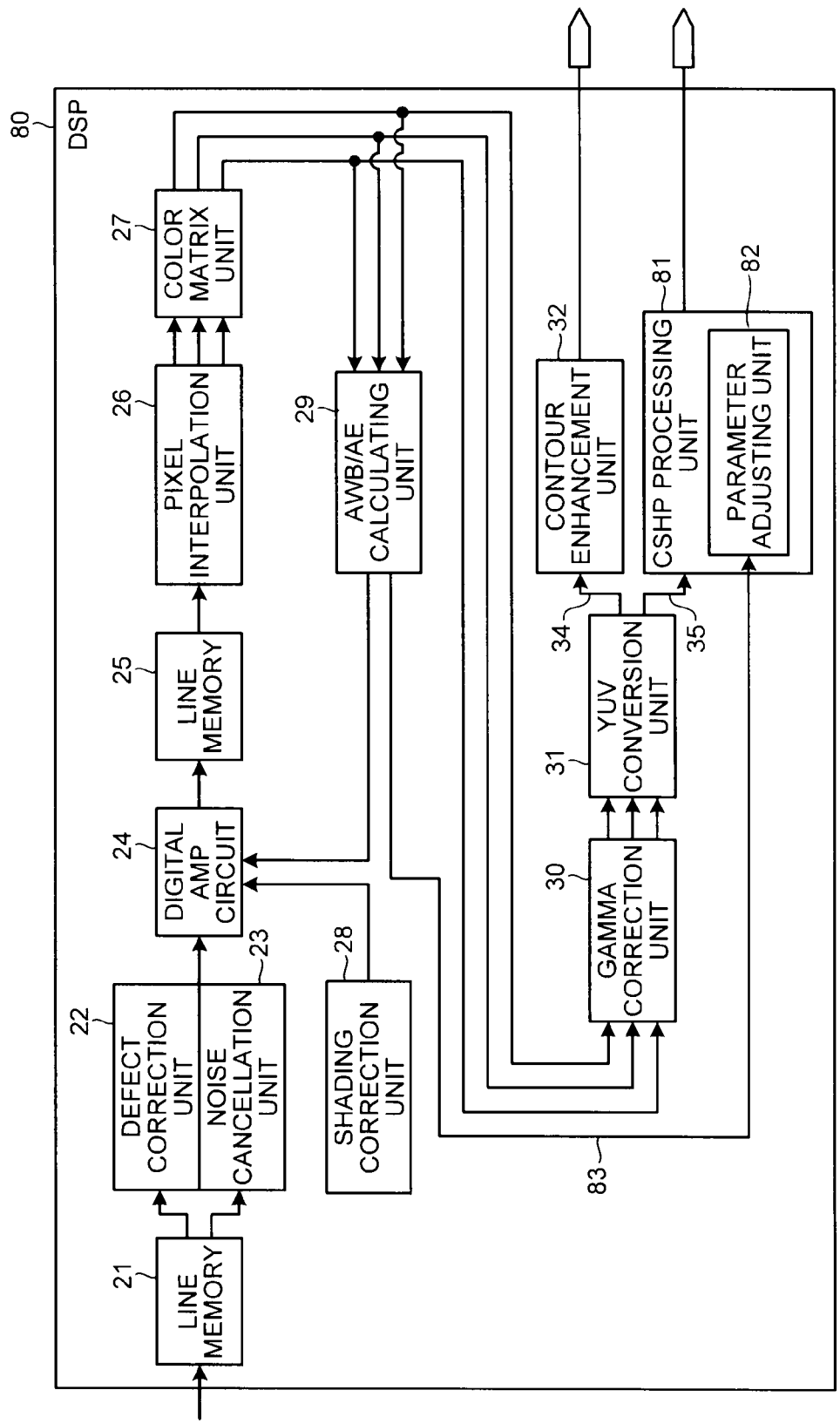
FIG. 8 is a block diagram illustrating the schematic structure of a DSP, which is an image processing apparatus according to a fifth embodiment.

FIG. 8 is a block diagram illustrating the schematic structure of a DSP, which is an image processing apparatus according to a fifth embodiment. The same components as those in the first and second embodiments are denoted by the same reference numerals and a description thereof will not be repeated. A CSHP processing unit 81 provided in a DSP 80 includes a parameter adjusting unit 82.

An AWB/AE calculating unit 29 generates brightness information 83 having the calculation result of an AE adjustment coefficient reflected thereto and outputs the brightness information 83 to the CSHP processing unit 81. The parameter adjusting unit 82 adjusts various kinds of parameters according to the brightness information 83.

Figure 9:
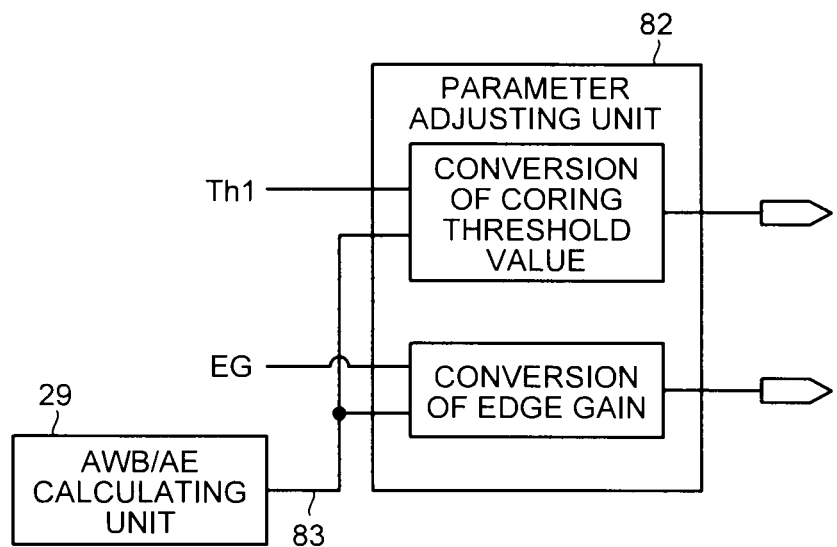
FIG. 9 is a diagram illustrating the adjustment of parameters by a parameter adjusting unit.

FIG. 9 is a diagram illustrating the adjustment of the parameters by the parameter adjusting unit. The parameter adjusting unit 82 converts the parameters of a coring threshold value Th1 and an edge gain EG according to the brightness information 83 during image capture which is input from the AWB/AE calculating unit 29.

Figure 10:
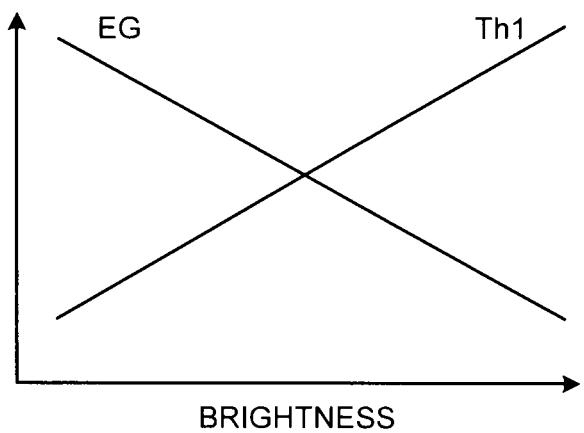
FIG. 10 is a diagram illustrating the conversion of a coring threshold value and an edge gain by the parameter adjusting unit.

FIG. 10 is a diagram illustrating the conversion of the coring threshold value and the edge gain by the parameter adjusting unit. In the graph shown in FIG. 10, the horizontal axis indicates brightness. In FIG. 10, it is assumed that brightness is reduced from the left to the right.

The parameter adjusting unit 82 converts the coring threshold value Th1 such that, as the brightness obtained from the brightness information 83 is reduced, the coring threshold value Th1 increases. The parameter adjusting unit 82 converts the coring threshold value Th1 such that the coring threshold value Th1 and brightness have, for example, a linear function relation therebetween. The parameter adjusting unit 82 outputs the converted coring threshold value Th1 to an edge coring unit 46 (see FIG. 4).

In addition, the parameter adjusting unit 82 converts the edge gain EG such that, as the brightness obtained from the brightness information 83 is reduced, the edge gain EG is reduced. The parameter adjusting unit 82 converts the edge gain EG such that the edge gain EG and brightness have, for example, a linear function relation therebetween. The parameter adjusting unit 82 outputs the converted edge gain EG to a multiplier 52 (see FIG. 5).

In the image processing apparatus, the application of the parameter adjusting unit 82 makes it possible to correct color noise using the optimal parameters corresponding to brightness during image capture. The parameter adjusting unit 82 increases the coring threshold value Th1 as luminance during image capture is reduced. In this way, it is possible to effectively reduce color noise at the boundary between colors.

The parameter adjusting unit 82 reduces the edge gain EG as luminance during image capture is reduced, thereby reducing the number of color edge components. Therefore, the degree of emphasis of the boundary between colors in a low-brightness portion is reduced. In this way, it is possible to reduce an unnatural color variation in the low-brightness portion.

The parameter adjusting unit 82 may be applied to the image processing apparatus according to any one of the first to fourth embodiments. The parameter adjusting unit 82 may adjust the coring threshold value Th2 used by the color difference coring unit 61 (see FIG. 6) according to the brightness information 83. The parameter adjusting unit 82 may adjust at least one of the coring threshold values Th1 and Th2 and the edge gain EG according to the brightness information 83.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a signal conversion unit that converts a signal of each color component into a color-difference signal and a brightness signal; and
a color-difference signal correction unit that corrects color noise of the color-difference signal from the signal conversion unit,
wherein the color-difference signal correction unit includes
a smoothing unit that performs a smoothing process on the color-difference signal to obtain a smoothed color-difference signal, and
a color edge extracting unit that extracts a color edge component to be added to the smoothed color-difference signal, and
wherein the color edge extracting unit includes an edge coring unit that performs a coring process on a difference between the color-difference signal before the smoothing process is performed and the smoothed color-difference signal.

2. The image processing apparatus according to claim 1,
wherein the color edge extracting unit multiplies the difference by an edge gain for adjusting a weight of the color edge component with respect to the smoothed color-difference signal.

3. The image processing apparatus according to claim 1,
wherein the color-difference signal correction unit further includes a color difference coring unit that performs a coring process on the smoothed color-difference signal to which the color edge component is added.

4. The image processing apparatus according to claim 1,
wherein the color-difference signal correction unit further includes a color difference coring unit that performs a coring process on the smoothed color-difference signal before the color edge component is added.

5. The image processing apparatus according to claim 4,
wherein the edge coring unit and the color difference coring unit share a circuit structure.

6. The image processing apparatus according to claim 1,
wherein the edge coring unit performs the coring process according to the comparison result between the difference and a predetermined coring threshold value, and
the color-difference signal correction unit further includes a parameter adjusting unit that adjusts the coring threshold value according to brightness information during image capture.

7. The image processing apparatus according to claim 2,
wherein the color-difference signal correction unit further includes a parameter adjusting unit that adjusts the edge gain according to brightness information during image capture.

8. An image processing method comprising:
converting a signal of each color component into a color-difference signal and a brightness signal; and
performing a color-difference signal correction in which color noise of the color-difference signal is corrected,
wherein the color-difference signal correction includes
performing a smoothing process on the color-difference signal to obtain a smoothed color-difference signal, and
performing a color edge extraction in which a color edge component to be added to the smoothed color-difference signal is extracted, and
wherein, in the performing of the color edge component extraction, an edge coring process which is a coring process is performed on a difference between the color-difference signal before the smoothing process is performed and the smoothed color-difference signal.

9. The image processing method according to claim 8,
wherein the difference is multiplied by an edge gain for adjusting a weight of the color edge component with respect to the smoothed color-difference signal.

10. The image processing method according to claim 8,
wherein, in the color-difference signal correction, a color-difference coring process which is a coring process is performed on the smoothed color-difference signal to which the color edge component is added.

11. The image processing method according to claim 8,
wherein, in the color-difference signal correction, a color-difference coring process which is a coring process is performed on the smoothed color-difference signal before the color edge component is added.

12. The image processing method according to claim 8,
wherein the edge coring process is performed according to a comparison result between the difference and a predetermined coring threshold value, and
the coring threshold value is adjusted according to brightness information during image capture.

13. The image processing method according to claim 9,
wherein the edge gain is adjusted according to brightness information during image capture.

14. A camera module comprising:
a lens unit that receives light from an object and forms an object image;
an image sensor that captures the object image; and
an image processing apparatus that processes an image signal acquired by an imaging operation of the image sensor,
wherein the image processing apparatus includes
a signal conversion unit that converts a signal of each color component into a color-difference signal and a brightness signal, and
a color-difference signal correction unit that corrects color noise of the color-difference signal from the signal conversion unit,
wherein the color-difference signal correction unit includes
a smoothing unit that performs smoothing process on the color-difference signal to obtain a smoothed color-difference signal, and
a color edge extracting unit that extracts a color edge component to be added to the smoothed color-difference signal, and wherein the color edge extracting unit includes an edge coring unit that performs a coring process on a difference between the color-difference signal before the smoothing process is performed and the smoothed color-difference signal.

15. The camera module according to claim 14,
wherein the color edge extracting unit multiplies the difference by an edge gain for adjusting a weight of the color edge component with respect to the smoothed color-difference signal.

16. The camera module according to claim 14,
wherein the color-difference signal correction unit further includes a color difference coring unit that performs a coring process on the smoothed color-difference signal to which the color edge component is added.

17. The camera module according to claim 14,
wherein the color-difference signal correction unit further includes a color difference coring unit that performs a coring process on the smoothed color-difference signal before the color edge component is added.

18. The camera module according to claim 17,
wherein the edge coring unit and the color difference coring unit share a circuit structure.

19. The camera module according to claim 14,
wherein the edge coring unit performs the coring process according to a comparison result between the difference and a predetermined coring threshold value, and
the color-difference signal correction unit further includes a parameter adjusting unit that adjusts the coring threshold value according to brightness information during image capture by the image sensor.

20. The camera module according to claim 15,
wherein the color-difference signal correction unit further includes a parameter adjusting unit that adjusts the edge gain according to brightness information during image capture by the image sensor.

* * * * *